United States Patent [19]

Takaishi

[11] Patent Number: 4,673,856
[45] Date of Patent: Jun. 16, 1987

[54] STEPPING MOTOR DRIVE CIRCUIT

[75] Inventor: Kazuaki Takaishi, Shizuoka, Japan

[73] Assignee: Tokyo Electric Co., Ltd., Tokyo, Japan

[21] Appl. No.: 801,089

[22] Filed: Nov. 22, 1985

[30] Foreign Application Priority Data

Nov. 30, 1984 [JP] Japan .................. 59-253070

[51] Int. Cl.$^4$ .............................................. H02P 8/00
[52] U.S. Cl. .................................... 318/696; 318/685
[58] Field of Search ................ 318/685, 696; 323/315; 330/296

[56] References Cited

U.S. PATENT DOCUMENTS 4,368,414  1/1983  Watanabe et al. .................. 318/696

Primary Examiner—William M. Shoop, Jr.
Assistant Examiner—Saul M. Bergmann
Attorney, Agent, or Firm—Frishauf, Holtz, Goodman & Woodward

[57] ABSTRACT

A stepping motor drive circuit includes a power source terminal and a reference potential terminal, a plurality of switching transistors, respectively connected between the reference potential terminal and ends of a plurality of excitation coils, for controlling currents flowing through the excitation coils, and a constant current control circuit for setting the currents flowing through the power source terminal and the excitation coils to a constant value. The constant current control circuit includes a first pnp transistor whose emitter is connected to the power source terminal through a first resistor and whose collector is connected to the other end of each of the excitation coils, and a second pnp transistor whose emitter is connected to the power source terminal and whose collector is connected to the reference potential terminal through a second resistor and to a base of the first pnp transistor and whose base is connected to the emitter of the first pnp transistor through a third resistor and to the collector of the first pnp transistor in series through a resistor and a capacitor.

16 Claims, 16 Drawing Figures

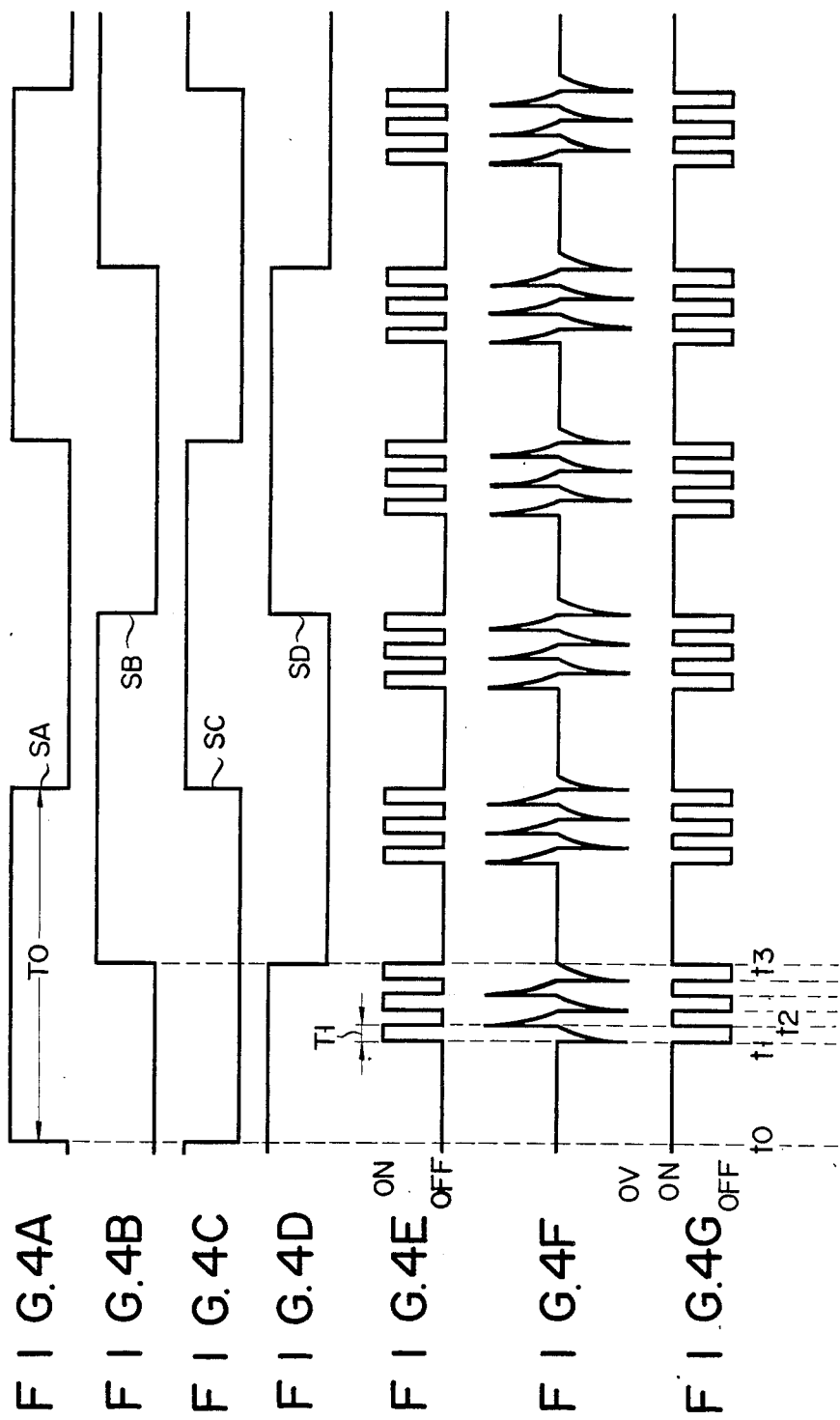

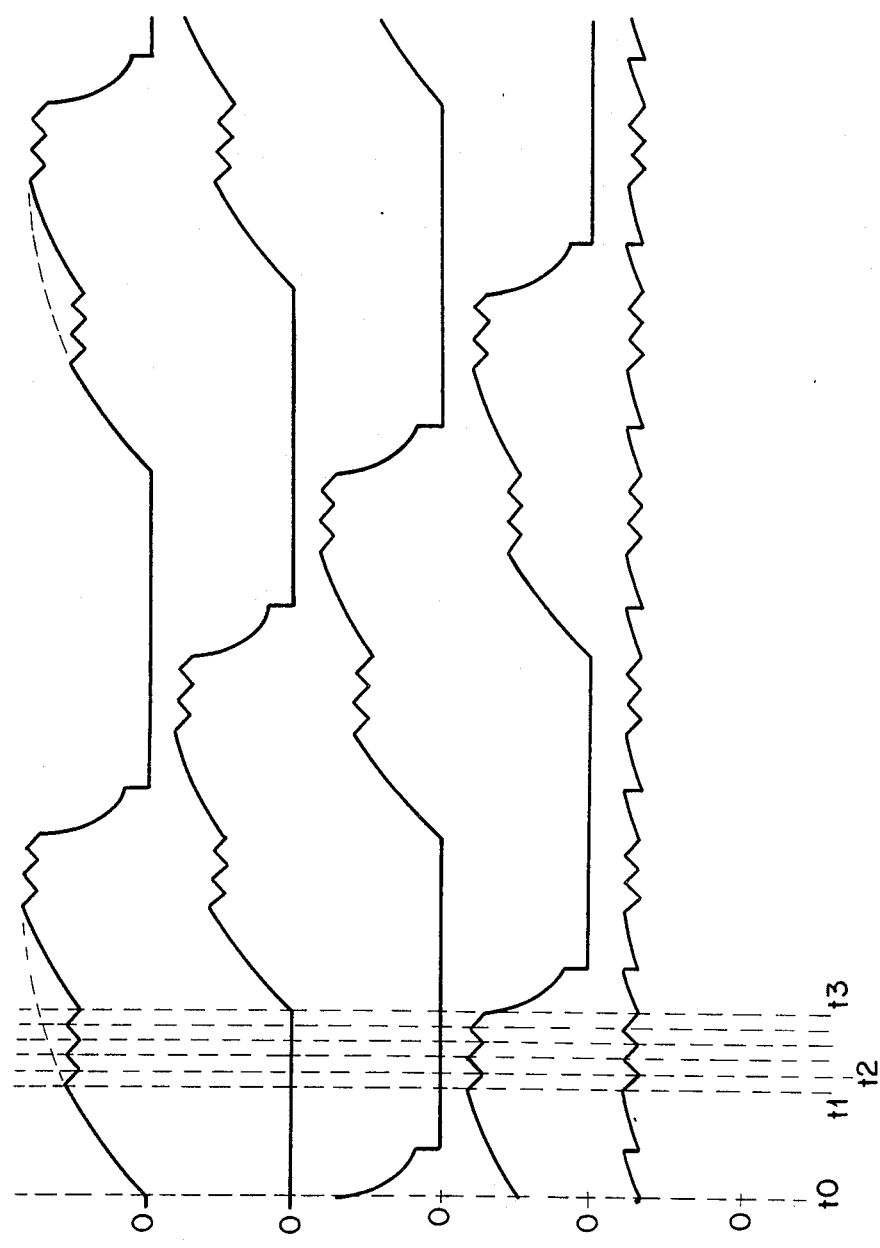

STEPPING MOTOR DRIVE CIRCUIT

BACKGROUND OF THE INVENTION

The present invention relates to a stepping motor drive circuit.

There are circuits for driving a stepping motor which is rotated and driven in response to an excitation phase switching signal or a step pulse signal supplied from an external control section. In such a drive circuit, generally, a switching device such as a transistor or the like which is turned on or off by the excitation phase switching signal is inserted in each excitation voltage supply path of each excitation coil constituting each excitation phase of the stepping motor, and when a level of the excitation phase switching signal is changed to switch the excitation phase, an excitation current flows through a corresponding excitation coil from a power source. Since the excitation coil has an inductance and an internal resistance, however, this excitation current value does not immediately become a specified value after the conduction of the switching transistor but increases in accordance with a characteristic curve which is determined by a time constant of the inductance and resistance value.

In general, to rotate the stepping motor at a high speed, it is necessary to improve the rise characteristic of a current flowing through each excitation coil when the excitation phase is changed over. Therefore, there has been proposed a stepping motor drive circuit in which such a rise characteristic of the current is improved and a constant current control circuit for controlling a current flowing through the excitation coil to be kept constant while a voltage is being applied to the excitation coil through the conductive switching transistor is interposed between the power source and each excitation coil.

For example, some of the constant current control circuits are constituted such that a large current flows at the start of conduction of the switching transistor using a current amplifying transistor and after an elapse of a constant period of time, the current is reduced and thereafter it is suppressed to a constant value.

However, the stepping motor drive circuit having such a constant current control circuit still has the following problems which must be solved. Namely, in the constant current control circuit, the current amplifying transistor is operated to suppress the current value a constant period of time after the current starts to rise, resulting in an increase in generation of heat due to the collector dissipation. Therefore, it is required to arrange devices and design a heat radiation mechanism in consideration of heat radiation due to the operation for a long time. On the other hand, a service life of a device could be reduced due to the heat generation as well.

SUMMARY OF THE INVENTION

It is an object of the present invention to provide a stepping motor drive circuit in which a rise characteristic of an excitation current which is supplied to each excitation coil is effectively improved.

This object is accomplished by a stepping motor drive circuit comprising: a plurality of switching transistors, respectively connected between a reference potential terminal and first ends of a plurality of excitation coils, for controlling currents flowing through these excitation coils; and a constant current control circuit, connected between a power source terminal and a second end of each of the plurality of excitation coils, for setting the currents flowing through the plurality of excitation coils to a constant value, wherein this constant current control circuit includes first and second resistors, a first transistor whose current path is connected at one end to the power source terminal through the first resistor and connected at the other end to each of the other ends of the plurality of excitation coils, a control circuit whose control terminal is connected to one end of the current path of the first transistor through the second resistor and which supplies a control signal to a base of the first transistor in response to a voltage drop in the first resistor thereby to control the conduction state of the first transistor, and a feedback circuit having a predetermined time constant and connected between the control terminal of the control circuit and the other end of the current path of the first transistor.

In this invention, since the feed-back circuit having a predetermined time constant is used, when the first transistor is made nonconductive, the voltage across the first resistor is not immediately set at a value nearly equal to 0V but gradually changes towards 0v in accordance with the time constant of the feedback circuit. Therefore, the first transistor is held in the nonconductive state for a predetermined period of time, thereby reducing the mean value of the current flowing through the excitation coil.

BRIEF DESCRIPTION OF THE DRAWINGS

FIGS. 4A to 4L are signal waveform diagrams for explaining the operation of the stepping motor drive circuit shown in FIGS. 2 and 3.

DETAILED DESCRIPTION OF THE PREFERRED EMBODIMENT

An embodiment of the present invention will now be described hereinbelow with reference to the drawings.

Figure 1:
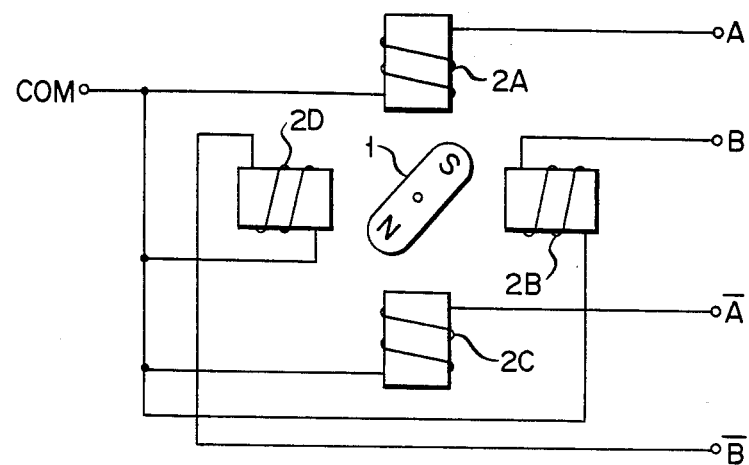
FIG. 1 is a schematic diagram of a stepping motor which is driven by a stepping motor drive circuit according to an embodiment of the present invention.

FIG. 1 schematically shows a stepping motor which is driven by a drive circuit of the embodiment, in which four excitation coils 2A, 2B, 2C, and 2D are arranged at regular intervals of 90° around a rotor 1 formed of a permanent magnet. Each end of excitation coils 2A to 2D is respectively connected to terminals A, B, $\overline{A}$, and $\overline{B}$ and the other ends are together connected to a common terminal COM.

Figure 2:
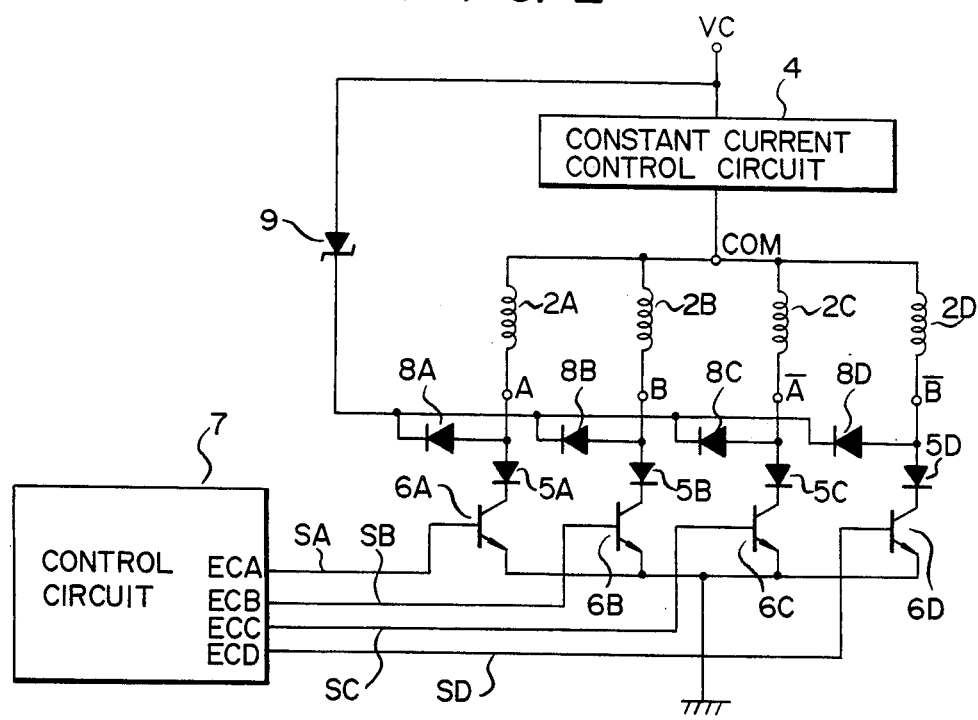
FIG. 2 is a circuit diagram of the stepping motor drive circuit according to an embodiment of the invention.

FIG. 2 is a circuit diagram showing the whole drive circuit. A DC excitation voltage of, e.g., +12 V is supplied to common terminal COM of excitation coils 2A to 2D from a power source terminal VC connected thereto through a constant current control circuit 4. The other terminals A, B, $\overline{A}$, and $\overline{B}$ of excitation coils 2A to 2D are grounded through protecting diodes 5A to 5D connected in the forward direction and npn type switching transistors 6A to 6D, respectively. Step pulse signals or excitation phase switching signals SA to SD are generated from output terminals ECA to ECD of an external control circuit 7 and supplied to bases of transistors 6A to 6D.

Terminals A, B, $\overline{A}$, and $\overline{B}$ of excitation coils 2A to 2D are connected to power source terminal VC through flywheel diodes 8A to 8D and a Zener diode 9 for suppressing a surge voltage, respectively.

Figure 3:
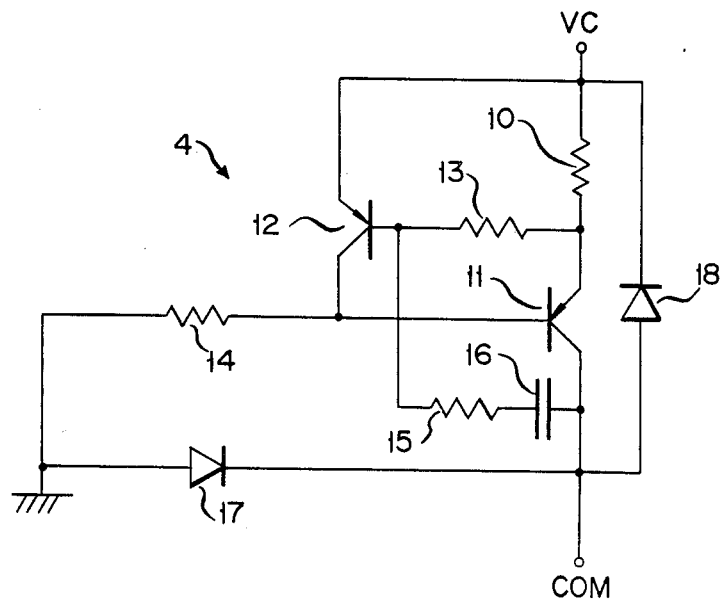
FIG. 3 is a circuit diagram of a constant current control circuit for use in FIG. 2.

FIG. 3 shows constant current control circuit 4. Control circuit 4 has a current detecting resistor 10 which is connected at one end to power source terminal VC and a current controlling pnp transistor 11 whose emitter is connected to the other end of resistor 10. A collector of transistor 11 is connected to common terminal COM of excitation coils 2A to 2D. An emitter of a pnp transistor 12 to control the conduction state of transistor 11 is connected to power source terminal VC. A base of transistor 12 is connected to the emitter of transistor 11 through a current limiting resistor 13. A collector of transistor 12 is connected to a base of transistor 11 and also grounded through a resistor 14.

A feedback circuit having a series circuit of a resistor 15 and a capacitor 16 is connected between the base of transistor 12 and the collector of transistor 11. A flywheel diode 17 is interposed between the collector of transistor 11 and the ground. A diode 18 is interposed between the collector of transistor 11 and power source terminal VC.

When transistor 11 is made conductive, electromagnetic energy is accumulated in each of excitation coils 2A to 2D. Flywheel diode 17 serves to form an energy releasing path to release those electromagnetic energies for the period of time while transistor 11 is kept nonconductive. Diode 18 is a protecting diode to prevent an abnormally high voltage from being applied to transistor 11.

The operation of the stepping motor drive circuit constituted as mentioned above will then be described with reference to time charts of FIGS. 4A to 4G. To rotate the stepping motor, step pulse signals SA to SD having the same period (pulse width $T_0$) are ordinarily generated from output terminals ECA to ECD of control circuit 7 such that their phases are shifted by $\doteq$ of the period at a time as shown in FIGS. 4A to 4D. Among those step pulse signals, when step pulse signal SA of phase "A" changes from a low level to a high level at time $t_0$, as shown in FIG. A, switching transistor 6A is made conductive.

In constant current control circuit 4 of FIG. 3, no excitation current flows yet through excitation coil 2A at time $t_0$; therefore, the voltage drop due to current detecting resistor 10 is sufficiently small, the base potential of transistor 12 is high, and transistor 12 is OFF, as shown in FIG. 4E. Thus, transistor 11 is held conductive, as shown in FIG. 4G. When transistor 6A is made conductive immediately after time $t_0$, an excitation current starts flowing through excitation coil 2A of phase "A", as shown in FIG. 4A, from power source terminal VC through resistor 10, transistor 11, and common terminal COM. As mentioned above, this excitation current increases in accordance with the characteristic curve which is determined by a time constant of the inductance and internal resistance of excitation coil 2A and resistor 10. Thereafter, when the excitation current flowing through excitation coil 2A through resistor 10 increases to a specified value at time $t_1$ (as shown in FIG. 4H) and the voltage drop in resistor 10 exceeds a inherent conducting voltage VBE between the base and emitter of transistor 12, transistor 12 is made conductive, as shown in FIG. 4E.

When a value of the excitation current reaches the specified current value at time $t_1$ and transistor 12 is made conductive, power source voltage VC is applied to the base of transistor 11 through transistor 12, causing transistor 11 to be turned off, as shown in FIG. 4G. When transistor 11 is turned off, the supply of the excitation current to excitation coil 2A is stopped.

The turn-off of transistor 11 allows capacitor 16 of the feedback circuit to be gradually charged through resistors 10, 13, and 15, as shown in FIG. 4F. Thus, the conductive state of transistor 12 is maintained. Capacitor 16 is further charged until time $t_2$ after an elapse of time $T_1$ which is determined by a time constant of the series circuit of resistors 10, 13, and 15, and capacitor 16. When the base potential of transistor 12 reaches a voltage which is lower than the power source voltage by a predetermined value, for example, 0.7 V, transistor 12 is turned off. Thus, transistor 11 is again made conductive.

As described above, after the excitation current flowing through excitation coil 2A reached the specified value, the conduction and nonconduction of transistor 11 are repeated at constant period $T_1$ corresponding to the time constant of resistor 15 and capacitor 16 of the feedback circuit as shown in the diagrams.

When step pulse signal SB of phase "B" rises at time $t_3$, as shown in FIG. 4B, and transistor 6B is made conductive and step pulse signal SD of phase "D" falls, as shown in FIG. 4D, and transistor 6D is turned off, the excitation current flowing through excitation coil 2D is cut off, as shown in FIG. 4K, and the excitation current, newly starts flowing through excitation coil 2B, as shown in FIG. 4I. The excitation current flowing through excitation coil 2B gradually rises due to the inductance of excitation coil 2B in a manner similar to the case of phase "A", so that the value of the current flowing through current detecting resistor 10 decreases to a sufficiently small value when it starts flowing. After the current flowing through coil 2B reached the specified value, as shown in FIG. 4I, the conduction and nonconduction of transistor 11 are repeated. FIG. 4L shows a total current flowing through common terminal COM.

As explained above, whenever the level of each excitation phase switching signal is changed to switch the excitation phase and the excitation current starts flowing through the corresponding excitation coil 2A, 2B, 2C, or 2D this excitation current continuously flows for a period of time from the time when the excitation current started flowing until the time when it reaches the predetermined specified value, as shown in FIGS. 4H to 4K. The excitation current intermittently and repeatedly flows at a constant period for a period of time until the next excitation phase switching signal is changed to a high level after the excitation current reached the specified value. Therefore, the mean value of the excitation current after it became the specified value is reduced, thereby making it possible to suppress the heat generation of current controlling transistor 11 after the excitation current reached the specified value. Consequently, even in designing of a circuit as well, there is no need to take account of deterioration of electronic parts and devices due to the heat generation as the result of the operation for a long time. In addition, less heat generation makes it possible to elongate the service lives of circuit elements constituting the circuit.

On one hand, the excitation current after it reached the specified value is chopper-processed by the use of the time constant of the feedback circuit having resistor 15 and capacitor 16; therefore, constant current control circuit 4 itself can be realized by a simple circuit arrangement and the manufacturing cost of the whole stepping motor drive circuit can be reduced.

Figure 5:
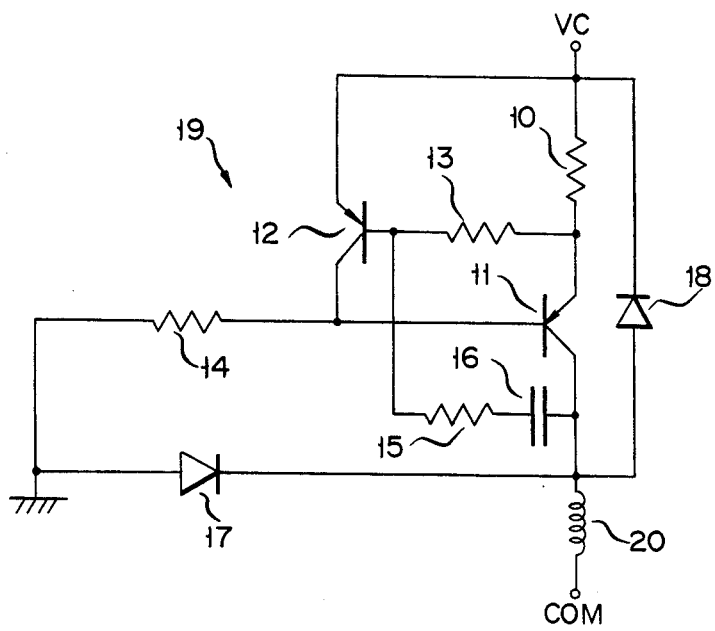
FIG. 5 shows a modified form of a constant current control circuit shown in FIG. 3.

FIG. 5 shows a constant current control circuit 19 in a stepping motor drive circuit according to another embodiment of the present invention, in which the same parts and devices as those in constant current control circuit 4 shown in FIG. 3 are designated by the same reference numerals and their descriptions are omitted.

In constant current control circuit 19 of this embodiment, an auxiliary choke coil 20 is interposed between the collector of transistor 11 to control the excitation current flowing through each of excitation coils 2A to 2D and common terminal COM of respective excitation coils 2A to 2D. By separately providing the choke coil at a position outside the stepping motor as mentioned above, the heat can be effectively dispersed.

What is claimed is:

1. A stepping motor drive circuit comprising:
   a common terminal, a power source terminal and a reference potential terminal;
   a plurality of switching means, respectively connected in series with a plurality of excitation coils between said reference potential terminal and said common terminal for controlling currents flowing through said excitation coils; and
   constant current control means, connected between said power source terminal and said common terminal for setting the currents flowing through said plurality of excitation coils to a substantially constant value,
   wherein said constant current control means includes first resistive means; a first transistor having one of its collector and emitter terminals connected to said power source terminal through said first resistive means and the other of its collector and emitter terminals connected to said common terminal; a control circuit means having a control terminal coupled to said one of the collector and emitter terminals of said first transistor for supplying a control signal to a base of said first transistor in response to a voltage drop in said first resistive means and thereby to control the conduction state of said first transistor; and a feedback circuit having a predetermined time constant connected between the control terminal of said control circuit means and the other of the collector and emitter terminals of said first transistor.

2. a drive circuit according to claim 1, wherein said constant current control means includes a second resistive means and said control circuit means includes a second transistor whose base is connected to said one of the collector and emitter terminals of said first transistor through said second resistive means, said second transistor having one of its collector and emitter terminals connected to said power source terminal, and the other of its collector and emitter terminals connected to the base of said first transistor and to said reference potential terminal through third resistive means.

3. A drive circuit according to claim 2, further comprising a coil connected between the other of the collector and emitter terminals of said first transistor and said common terminal.

4. A drive circuit according to claim 3, wherein said first transistor is a pnp transistor whose emitter is connected to said first resistive means, and said second transistor is a pnp transistor whose emitter is connected to said power source terminal.

5. A drive circuit according to claim 4, wherein said feedback circuit includes a series circuit of a resistor and a capacitor.

6. A drive circuit according to claim 5, wherein said constant current control means further includes a flywheel diode connected between the other of its collector and emitter terminals of said first transistor and said reference potential terminal.

7. A drive circuit according to claim 4, wherein said constant current control means further includes a flywheel diode connected between the other of its collector and emitter terminals of said first transistor and said reference potential terminal.

8. A drive circuit according to claim 3, wherein said constant current control means further includes a flywheel diode connected between the other of its collector and emitter terminals of said first transistor and said reference potential terminal.

9. A drive circuit according to claim 3, wherein said feedback circuit includes a series circuit of a resistor and a capacitor.

10. A drive circuit according to claim 2, wherein said first transistor is a pnp transistor whose emitter is connected to said first resistive means, and said second transistor is a pnp transistor whose emitter is connected to said power source terminal.

11. A drive circuit according to claim 2, wherein said feedback circuit includes a series circuit of a resistor and a capacitor.

12. A drive circuit according to claim 2, wherein said constant current control means further includes a flywheel diode connected between the other of its collector and emitter terminals of said first transistor and said reference potential terminal.

13. A drive circuit according to claim 1, further comprising a coil connected between the other of its emitter and collector terminals of said first transistor and said common terminal.

14. A drive circuit according to claim 1, wherein said first transistor is a pnp transistor whose emitter is connected to said first resistive means, and said second transistor is a pnp transistor whose emitter is connected to said power source terminal.

15. A drive circuit according to claim 1, wherein said feedback circuit includes a series circuit of a resistor and a capacitor.

16. A drive circuit according to claim 1, wherein said constant current control means further includes a flywheel diode connected between the other of its collector and emitter terminals of said first transistor and said reference potential terminal.

* * * * *